(12) United States Patent
Mattila et al.

(10) Patent No.: US 7,930,342 B2
(45) Date of Patent: Apr. 19, 2011

(54) METHOD, TERMINAL DEVICE AND SYSTEM ALLOWING FOR HANDLING LOCATION SERVICES INDEPENDENTLY FROM A CELLULAR COMMUNICATION SYSTEM

(75) Inventors: Arto Mattila, Lempäälä (FI); Timo Kivinen, Tampere (FI); Tommi Ojala, Tampere (FI)

(73) Assignee: Nokia Corporation, Espoo (FI)

( * ) Notice: Subject to any disclaimer, the term of this patent is extended or adjusted under 35 U.S.C. 154(b) by 937 days.

(21) Appl. No.: 10/703,189

(22) Filed: Nov. 6, 2003

(65) Prior Publication Data

US 2004/0132465 A1 Jul. 8, 2004

(30) Foreign Application Priority Data

Nov. 8, 2002 (WO) ........................ PCT/IB02/04684

(51) Int. Cl.
*G06F 15/16* (2006.01)
*H04W 24/00* (2009.01)
(52) U.S. Cl. ..................................... 709/203; 455/456.1
(58) Field of Classification Search .................. 709/203; 455/456.1
See application file for complete search history.

(56) References Cited

U.S. PATENT DOCUMENTS

| | | | |
|---|---|---|---|
| 5,508,708 A * | 4/1996 | Ghosh et al. .................. 342/457 |
| 6,498,939 B1 * | 12/2002 | Thomas ...................... 455/562.1 |
| 6,553,310 B1 * | 4/2003 | Lopke ........................... 701/213 |
| 6,952,181 B2 * | 10/2005 | Karr et al. ..................... 342/457 |
| 6,990,534 B2 * | 1/2006 | Mikhailov et al. ............ 709/250 |
| 7,003,288 B2 * | 2/2006 | Ueda et al. .................... 455/418 |
| 7,054,901 B2 * | 5/2006 | Shafer ........................... 709/203 |
| 2002/0007401 A1 * | 1/2002 | Suzuki ........................... 709/207 |
| 2002/0010753 A1 * | 1/2002 | Matsuoka et al. ............ 709/217 |
| 2002/0126701 A1 | 9/2002 | Requena |
| 2002/0133545 A1 * | 9/2002 | Fano et al. .................... 709/203 |
| 2004/0203854 A1 * | 10/2004 | Nowak ........................ 455/456.1 |

FOREIGN PATENT DOCUMENTS

| | | |
|---|---|---|
| EP | 1056306 A1 | 11/2000 |
| KR | 10-2002-0058764 | 7/2002 |
| WO | WO 98/58506 | 12/1998 |

OTHER PUBLICATIONS

Selected English Language Translation of Korean Patent Laid-Open No. 10-2002-0058764.

(Continued)

*Primary Examiner* — Tonia L Dollinger
*Assistant Examiner* — Mark D Fearer
(74) *Attorney, Agent, or Firm* — Ditthavong Mori & Steiner, P.C.

(57) ABSTRACT

The basic concept of the method for requesting location related information of a mobile communication terminal device comprises an encoding of a location request. The location request contains information and commands for instructing a receiving location serving networked device to retrieve location related information accordingly and a transmitting of the encoded location request to the location serving networked device. The basic concept of the method for serving for serving location related information of a mobile communication terminal device comprises a receiving of a location request as defined above, a retrieving of the location related information in accordance with the location request, an encoding of a location response in accordance with the retrieval results and containing at least the retrieved location related information and transmitting of the encoded location response to the mobile communication terminal device. Devices performing these methods are shown.

24 Claims, 3 Drawing Sheets

OTHER PUBLICATIONS

English Language Translation of Korean Office Action Dated Oct. 13, 2006.

3GPP TS 03.71 V8.7.0 (Sep. 2002), Technical Specification 3rd Generation Partnership Project; Technical Specification, Sep. 2002. Group Services and System Aspects; Location Services (LCS); Jun. 1999, (Functional description)—Stage 2 (Release 1999).

3GPP TS 48.031 V5.0.0 (Jul. 2002), Technical Specification 3rd Generation Partnership Project; Technical Specification, Sep. 2002. Group GSM EDGE Radio Access Network; Location Services (LCS); 1999, Serving Mobile Location Centre—Serving Mobile Location Centre, Jun. 2001.

(SMLC—SMLC); SMLCPP specification (Release 5), 1999.

* cited by examiner

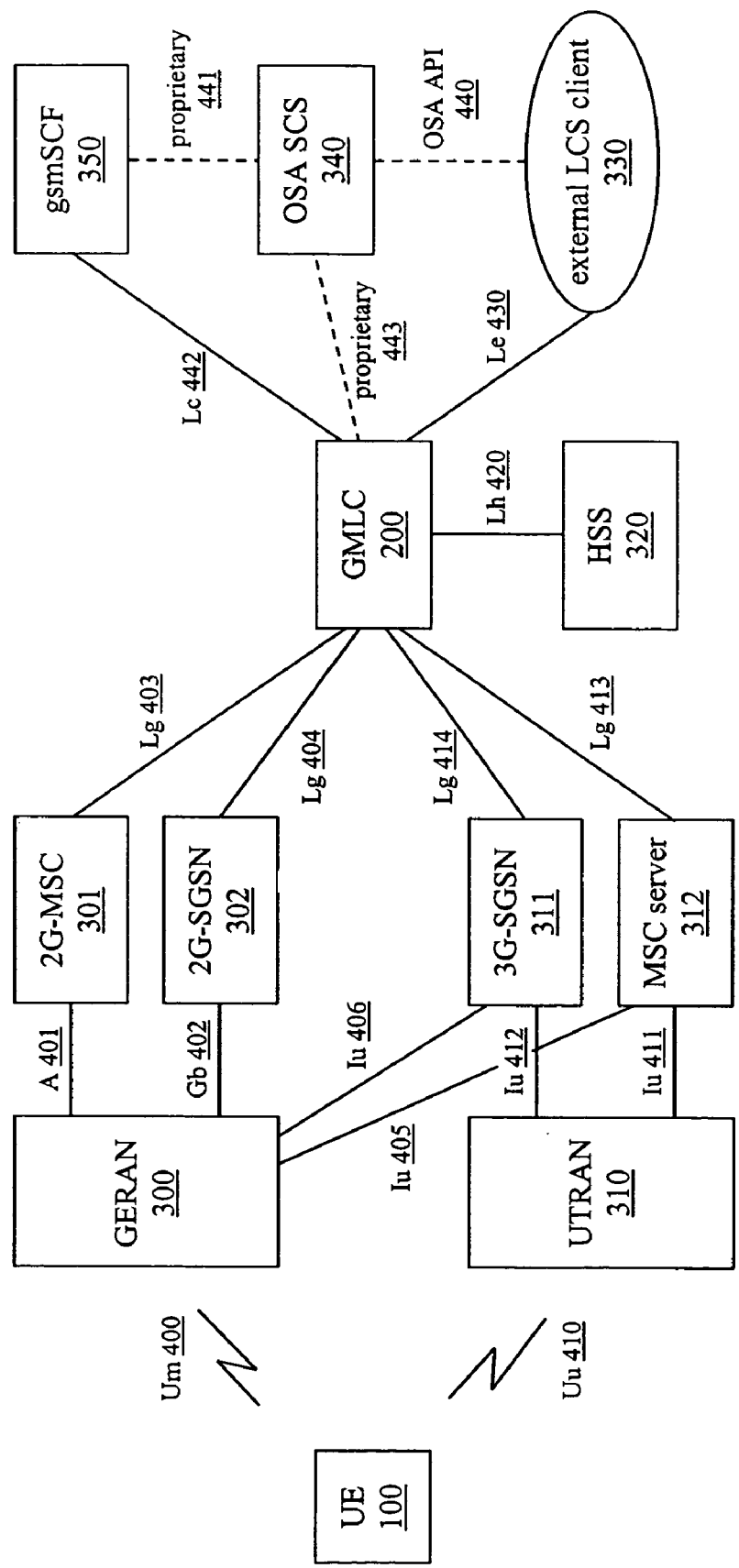
Fig. 1 (State of the Art)

METHOD, TERMINAL DEVICE AND SYSTEM ALLOWING FOR HANDLING LOCATION SERVICES INDEPENDENTLY FROM A CELLULAR COMMUNICATION SYSTEM

CROSS-REFERENCE TO RELATED APPLICATION

This application claims priority from International Application PCT/IB02/04684 filed Nov. 8, 2002 under 35 U.S.C. §119.

BACKGROUND OF THE INVENTION

1. Field of Invention

The present invention relates to a method for requesting location related information of a mobile terminal device, to a terminal device and to a system that allows the handling of location services in a manner that is independent from a cellular communication system, especially in mobile networks.

2. Discussion of Related Art

Different techniques are available to determine information about positions and/or locations of mobile communication equipment, especially mobile communication terminals. A position/location information may relate to a set of data defining the position of mobile communication equipment in relationship to a reference coordinate system, having an application-specific data format and/or being based on or derived from position information such as geographical coded information e.g. street names, altitudes, velocities etc. The determination of such position/location information allows for providing a broad number of applications and services being based thereon, employing it, assisted thereby and depending thereon, respectively.

In principle, these location featured applications and services may be divided into two classes of applications and services, and more precisely, a location based service or application, i.e. for example an application or a service which uses information about location and/or position for processing a corresponding derived or dependent service information based thereon, and a location dependent service or application, i.e. for example an application or a service available and/or allowed for being used within a certain predefined geographical area.

In general, location featured applications and services will become one of the coming key features and solutions therefore are just under development. Presently, the access to location services provided by cellular communication systems distinguishes between internal client and external client, i.e. mobile communication terminal device being subscribed in the cellular communication system and acting as clients requesting location services and networked entities accessing the location services provided by operators of cellular communication systems from exterior, respectively. The access procedures differ for internal and external clients. Hence, operators of public land mobile networks (PLMN) have to implement location service (LCS) logic for both potential clients resulting in a scattered, redundant and consequently in an uneconomical implementation.

Moreover, a location based application holds a key role in the transaction as it initiates a positioning function. In order to make a best use out of the positioning function as well as to achieve a best possible user experience of the location enabled consumer services, a major part of the application execution and process will reside physically in the mobile terminal. In these use cases location information as a result of the positioning function should be available in the mobile terminal available for the terminal resident application use.

An object of the invention is to provide an interoperable method allowing a mobile communication terminal device for employing location services (LCS) in a way independent of a cellular communication system in which the mobile communication terminal device is subscribed. A further object of the invention is to provide a mobile communication terminal device allowing for operation of the inventive method and a system comprising a mobile communication terminal device and a location serving entity capable of performing the inventive method.

SUMMARY OF THE INVENTION

The advantages of the present invention include the possibility to an operator of a public land mobile network to centralize location services and supplementary location related services like charging and billing of location request, a centralized privacy handling of requests and providing of enhanced location services such as geo-services (translating basic position information given in longitude, latitude and accuracy into city and street related location information). Both external and internal LCS clients are allowed to request for position/location information about mobile communication terminal devices in a similar and equivalent way, respectively. Moreover, the radio access network (RAN) independent method for requesting position/location information, originating from a mobile communication terminal device also enables to provide location services in public land mobile networks which do not inherently support these location services (such as IS-95). Additionally, multi-modal products for being used in different radio access networks being based on different standards have not to implement all RAN specific location service procedures but are even capable of offering location services therewith.

According to an embodiment of the invention, a method for requesting a location related information of a mobile communication terminal device from a location serving networked device, i.e. a location server providing or mediating location/position information comprises the steps of receiving an initiation, encoding a location request and transmitting the encoded location request.

The initiation, to be understood as an initiation signal, is caused by an initiator which may be an autonomous by triggered initiating application executed on the mobile communication terminal or be by a user input. The initiation signalizes to the mobile communication terminal device or an application operated thereon to generate the location request. The encoding of the location request is performed in accordance with a predefined coding format applicable to the location request. The location request contains at least, but not limited thereto, identification information about the mobile communication terminal device and at least a set of one or more instructions indicating to the location request receiving location, i.e. to the serving networked device to retrieve location related information in accordance therewith. The transmitting of the encoded location request communicates the encoded location request to the location serving networked device via a wireless communication network. The wireless communication network may further hand over the communicated encoded location request to a wired communication network to which the location serving networked device is coupled.

According to an embodiment of the invention, the mobile communication terminal device receives an encoded location response as a consequence of the previous transmittal of the encoded location request. The encoding of the location response is performed in accordance with the location request, i.e. the location response includes at least location related information in accordance with the set of one or more instructions requesting retrieval of location related information. The encoded location response is decoded in the mobile communication terminal device. The decoding results in the location related information contained therein which may be supplied to one or more applications executed on the mobile communication terminal device for further processing.

According to an embodiment of the invention, the encoding is based on either an extended markup language (XML) encoding or a binary coded extended markup language, for example, but not limited thereto, the wireless binary extended markup language (WBXML) as the most common binary coding for extended markup language (XML) used in conjunction with wireless communications. The encoding of the location request in accordance with either XML or binary coded XML results in a well-defined XML-based location request and a well-defined binary coded XML-based location request, respectively. A corresponding document type description (DTD) is associated to the XML encoding and the binary coded XML encoding, defining the structure and content of the resulting XML-based and binary coded XML-based document to be decodable later when required.

According to an embodiment of the invention, the transmitting of the encoded location request comprises further a binding of the encoded location request, an attaching of communication protocol related information to the location request and a transmitting of the attached location request.

The binding of the encoded location request results in a location request being bound to an appropriate communication protocol supported by the mobile communication terminal device. This appropriate communication protocol is also applicable to the location serving networked device receiving the bound location request. Alternatively, an intermediate networked service may be interposed between the communication of the mobile communication terminal device and the location serving networked device and may convert the communication protocol employed by the mobile communication terminal device to a communication protocol being supported by the location serving networked device and vice versa. For example, one communication protocol from among the hypertext transfer protocol (HTTP), the wireless application protocol (WAP), the wireless session protocol (WSP), the wireless datagram protocol (WDP), and the like are appropriate communication protocols and may be employed as communication protocol but the possible applicable communication protocols shall not be limited thereto.

Communication protocol related information is attached to the location request, i.e. all the additional required information is encoded therein such as header information comprising content type identification (multimedia internet mail extension type: MIME type), content size information, receiver identification and the like.

The attached and bound location request is finally transmitted via a corresponding communication protocol stack performing the physical aspects of the communication. For example, in accordance with the hypertext transfer protocol (HTTP), the wireless application protocol (WAP), the wireless session protocol (WSP) and the wireless datagram protocol (WDP), respectively, a hypertext transfer protocol stack, wireless application protocol stack, wireless session protocol stack and a wireless datagram protocol stack may be employed for transmitting, respectively, but the possible applicable communication protocol stacks shall not be limited thereto.

According to an embodiment of the invention, the encoded location response is based on either an extended markup language (XML) encoding or a binary coded extended markup language, for example, but not limiting thereto, the wireless binary extended markup language (WBXML) as the most common binary coding for extended markup language (XML) used in conjunction with wireless communications. The encoding of the location response in accordance with either XML or binary coded XML results in a well-defined XML-based location response and a well-defined binary coded XML-based location response, respectively. A corresponding document type description (DTD) is associated to the XML encoding and the binary coded XML encoding, defining the structure and content of the resulting XML-based and binary coded XML-based document to be decodable later when required.

Particularly, the encoding of the location request and the resulting location response may be based on the same or related document type description (DTD).

According to an embodiment of the invention, the decoding of the encoded location response comprises a parsing of the location response. The parsing of the location response may be performed in accordance with the encoding of the location response. Particularly, the parsing may be based on the respective document type description (DTD) associated with the XML-based or binary coded XML-based encoding of the location response.

According to an embodiment of the invention, a method for serving location related information of a mobile communication terminal device is provided. The method comprises a receiving of a location request, a retrieving of the location related information, an encoding of a location response and a transmitting of the location response.

The location request is received from the mobile communication terminal device and contains at least, but not limited to, identification information about the mobile communication terminal device and at least a set of one or more instructions indicating a request or instruction to retrieve location related information in accordance therewith. The retrieving is performed with the information provided by the received location request. The encoding of the location response is based on the results of the retrieving operation. Correspondingly, the location response contains at least the location related information retrieved in response to the location request. The location response is transmitted back to the mobile communication terminal device that transmitted the location request.

According to an embodiment of the invention, the location request is an encoded location request. The encoding of the location request is based on either a XML encoding or a binary coded XML encoding, for example, but not limited thereto, the wireless binary extended markup language (WBXML) as the most common binary coding for extended markup language (XML) used in conjunction with wireless communications. The XML encoding and the binary coded XML encoding result in a well-defined XML-based location response and a well-defined binary coded XML-based location response, respectively. Corresponding document type description (DTD) is associated to the XML encoding and the binary coded XML encoding, defining the structure and content of the resulting XML-based and binary coded XML-based document to be decodable later when required.

According to an embodiment of the invention, the encoded location request is parsed for extracting the contained information.

According to an embodiment of the invention, the encoding of the location response is based on either an extended markup language (XML) encoding or a binary coded extended markup language, for example, but not limited thereto, the wireless binary extended markup language (WBXML) as the most common binary coding for extended markup language (XML) used in conjunction with wireless communications. The encoding of the location response in accordance with either XML or binary coded XML results in a well-defined XML-based location response and a well-defined binary coded XML-based location response, respectively. A corresponding document type description (DTD) is associated to the XML encoding and the binary coded XML encoding, defining the structure and content of the resulting XML-based and binary coded XML-based document to be decodable later when required According to an embodiment of the invention, the transmitting of the encoded location response comprises further a binding of the encoded location response, an attaching of communication protocol related information to the location response and a transmitting of the attached location response.

The binding of the encoded location response results in a location response being bound to an appropriate communication protocol supported by the location serving networked device.

This appropriate communication protocol is also applicable to the mobile communication terminal device receiving the location response bound to the appropriate communication protocol. Alternatively, an intermediate networked service may be interposed between the communication of the location serving networked device and the mobile communication terminal device and may convert the communication protocol employed by the location serving networked device to a communication protocol being supported by the mobile communication terminal device and vice versa, respectively. For example, one protocol from among various protocols such as the hypertext transfer protocol (HTTP), the wireless application protocol (WAP), the wireless session protocol (WSP), the wireless datagram protocol (WDP), and the like are appropriate communication protocols and may be employed as a communication protocol but the possible applicable communication protocols shall not be limited thereto.

Communication protocol related information is attached to the location response, i.e. all the additional required information is encoded therein such as header information comprising content type identification (e.g. multimedia internet mail extension type: MIME type), content size information, receiver identification, and the like.

The location response is finally transmitted via a corresponding communication protocol stack performing the physical aspects of the communication. For example, in accordance with the hypertext transfer protocol (HTTP), the wireless application protocol (WAP), the wireless session protocol (WSP) and the wireless datagram protocol (WDP), respectively, a hypertext transfer protocol stack, wireless application protocol stack, wireless session protocol stack and a wireless datagram protocol stack may be employed for transmitting, respectively, but the possible applicable communication protocol stacks shall not be limited thereto.

According to an embodiment of the invention, a software tool for handling a location related information of a mobile communication terminal device is provided. The software tool comprises program portions for carrying out the operations of the aforementioned methods when the software tool is implemented in a computer program and/or executed.

According to an embodiment of the invention, there is provided a computer program product for handling of a location related information about a mobile communication terminal device. The computer program comprises program code portions directly loadable into a local memory of a processing device, a terminal device, a mobile communication terminal device or a networked device for carrying out the operations of the aforementioned methods when the program is executed thereon.

According to an embodiment of the invention, a computer program product for handling of location related information about a mobile communication terminal device is provided which comprises program code portions stored on a computer readable medium for carrying out the aforementioned methods when the program product is executed on a processing device, a terminal device, a mobile communication terminal device or a networked device.

According to further embodiment of the present invention there is provided a computer data signal embodied in a carrier wave and representing a program which, when executed by a processor, causes any of the above-described method steps to be carried out. Thereby carrier waves containing a set of coded instructions are covered.

According to an embodiment of the invention, a mobile communication terminal device for handling of location related information about a mobile communication terminal device is provided. The mobile communication terminal device comprises a component for receiving an initiation, a component for encoding said location request and a communication interface for transmitting the encoded location request.

The component for receiving an initiation represents an initiator which may be an autonomously triggered initiating application executed on the mobile communication terminal or by be a user input. The component for encoding operates in accordance with a predefined coding format applicable to the location request. The location request contains at least, but not limited to, identification information about the mobile communication terminal device and at least a set of one or more instructions indicating to the location serving networked device to retrieve location related information in accordance therewith. The communication interface is employed to transmit the encoded location request to the location serving networked device via a cellular communication system. The cellular communication system may further hand over the communicated encoded location request to a wired communication network to which the location serving networked device is coupled According to an embodiment of the invention, the communication interface of the terminal device is able to receive an encoded location response for decoding both a component for parsing. The encoding of the location response is performed in accordance with the location request, i.e. the location response includes at least location related information in accordance with the set of one or more instructions requesting retrieval of location related information. The component for parsing decodes the encoded location response. The decoding results in the location related information contained therein which may be supplied to one or more applications executed on the mobile communication terminal device for further processing.

According to an embodiment of the invention, the mobile communication terminal device is operable with an embodiment of the aforementioned method for requesting location related information of a mobile communication terminal device from a location serving networked device, i.e. a location server providing or mediating location/position information.

According to an embodiment of the invention, a location serving networked device for serving location related information of a mobile communication terminal device is provided. The method comprises a communication interface for receiving a location request and transmitting a location response, a component for retrieving the location related information and component for encoding the location response.

The communication interface of the serving device allows receipt of the location request from the mobile communication terminal device. The location request contains at least, but not limited to, identification information about the mobile communication terminal device and at least a set of one or more instructions requesting retrieval of location related information in accordance therewith. The component for retrieving is capable of performing the retrieval of the location related information with the information provided by the received location request. The component for encoding of the location response performs encoding of the location response on the basis of the results of the retrieval operation. Correspondingly, the location response contains at least the location related information retrieved in response to the location request. The communication interface allows further to transmit the location response back to the mobile communication terminal device that transmitted the location request.

According to an embodiment of the invention, the location serving networked device is operable with an embodiment of the aforementioned method for serving location related information of a mobile communication terminal device.

According to an embodiment of the invention, a system allowing for handling location related information of a mobile communication terminal device comprises at least the mobile communication terminal device and a location serving networked device being interconnected via a communication network at least partially comprising a cellular communication network. In detail the mobile communication terminal device is a mobile communication terminal device for requesting location related information from a location serving networked device as described above and the location serving networked device is a location serving networked device for serving location related information of a mobile communication terminal device as aforementioned.

BRIEF DESCRIPTION OF THE DRAWINGS

The invention will be described in greater detail by means of embodiments with reference to the accompanying drawings, in which FIG. 1 shows a schematic block diagram illustrating a state of the art LCS (location service) architecture in accordance with the 3GPP (3$^{rd}$ Generation Partnership Project) standard;

Same or equal parts, components and/or operations shown in the figures will be referred to using the same reference numerals.

DETAILED DESCRIPTION OF EMBODIMENTS

Figure 2A:
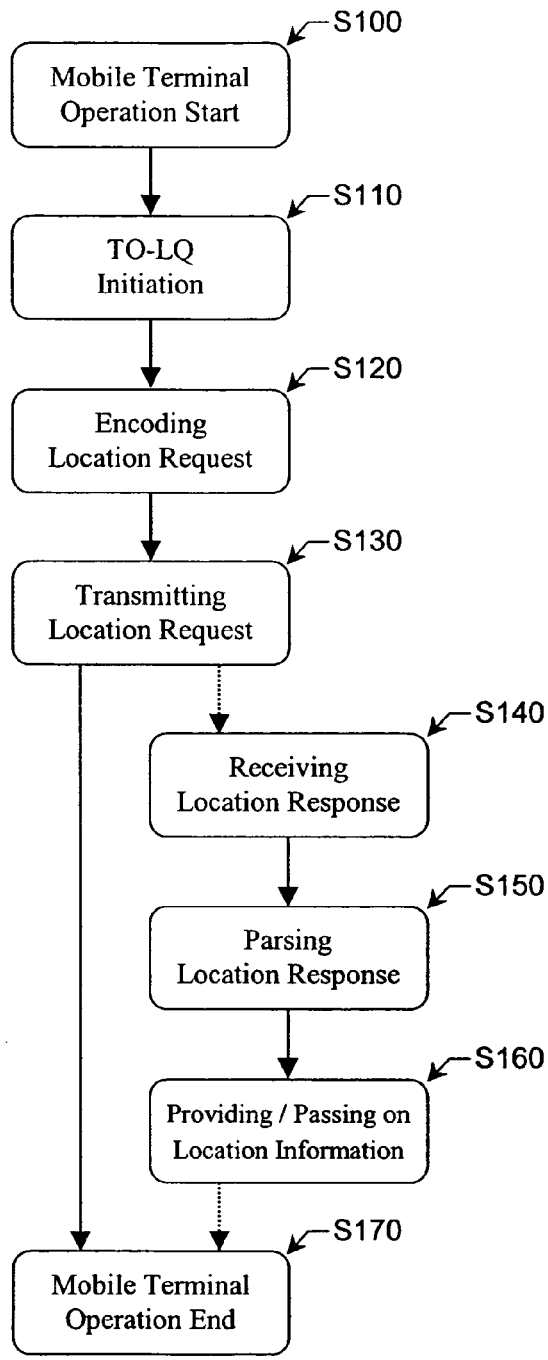
FIG. 2a shows a first flow chart illustrating an operational sequence carried out by a mobile communication terminal device according to an embodiment of the invention.

FIG. 1 shows a schematic block diagram illustrating a typical location service (LCS) architecture in accordance with the 3GPP (3$^{rd}$ Generation Partnership Project) standard. The FIG. 1 relates in a general form to location service (LCS) features in global system for mobile communication (GSM) and universal mobile telecommunication system (UMTS).

Typically with respect to a GSM public land mobile network (PLMN) a mobile communication terminal device 100 (UE; user equipment) is coupled to the corresponding radio access network, herein a GSM edge radio access network (GERAN) 300 via an appropriate air interface, furthermore herein a GERAN air interface (Um) 400. It shall be noted that the mobile communication terminal device 100 represents one or more mobile communication terminal devices 100 being coupled to the radio access network (GERAN) 300. The GERAN 300 comprises typically base transceiver stations (BTS) and base station controllers (BSC) connected thereto. The system of base transceiver stations (BTS) and base station controllers (BSC) is further designated as base station (sub-)system (BSS). The location services (LCS) within the presented cellular communication network (herein a GSM network) are moreover supported by one or more second generation service switching centers (2G-MSC) 301 and one or more second generation serving GPRS (general packet radio service) support nodes (2G-SGSN) 302. Both the 2G-MSC 301 and the 2G-SGSN 302 contain functionality allowing for mobile communication terminal device subscription authorization and managing positioning requests of the location services (LCS). The involving of either the 2G-MSC 301 and the 2G-SGSN 302 in the localization procedures depends among other things on the kind of localization method utilized for determining the mobile communication terminal device 100 as well as the capabilities and functionality implemented in and provided by the mobile communication terminal device 100, particularly the involving of the either 2G-MSC 301 and the 2G-SGSN 302 depends on the capability of the mobile communication terminal device 100 to operate or to employ general packet radio service (GPRS) or circuit switching data (CSD) service, respectively. The 2G-MSC 301 is coupled to the GERAN 300 via A interface 401 or Abis interface 401, respectively. The 2G-SGSN 302 is coupled to the GERAN 300 via a base station subsystem to 2G-SGSN interface (Gb interface) 402.

Basically, GERAN LCS (location service) procedures for determining position information about a mobile communication terminal device are standardized and especially the following methods are to be employed for determining position information:

cell coverage based positioning method;
enhanced observed time difference (E-OTD) positioning method; and
GPS (global positioning system) based positioning method.

The aforementioned presented position determining procedures are out of the scope of the present invention and reference may be made to the 3$^{rd}$ Generation Partnership Project (3GPP) standard documentation for retrieving detailed descriptions. The GERAN LCS (location service) procedures for determining position information are performed in the GERAN 300 and especially by a serving mobile location center (SMLC) being coupled to the base station (sub)system (BSS) via a dedicated Lb interface or being implemented in the base station controller (BSS). The serving mobile location center (SMLC) supports the LCS functionality of the GERAN 300.

A home subscriber service entity (HSS) 320 represents and includes both a second generation home location register (2G-HLR) and a third generation home location register (3G-HLR). A home location register (HLR) contains at least location service (LCS) subscriber information and routing information and is accessible from a gateway mobile location center (GMLC) 200 via a home location register interface (Lh) 420. The comprised 2G-HLR is logically associated with the GERAN 300 and further GSM network components thereof, whereas the comprised 3G-HLR is logically associated with the UTRAN 310 and further UMTS network components thereof. The depiction of this comprehensive HSS 320 is made for simplification intended not for limiting the scope of the invention. The depicted home subscriber service entity (HSS) 320 shall represent an arbitrary number of subscriber service entities.

The gateway mobile location center (GMLC) 200 represents a networked location service entity for serving location information of requested mobile communication terminal devices such as the mobile communication terminal device 100. Particularly, the GMLC represents a gateway device for receiving, managing and mediating location requests for mobile communication terminal devices and transmitting corresponding responses containing available location/position information about one or more requested mobile communication terminal devices. The GMLC 200 primarily operates as a gateway device being operable with external LCS clients, i.e. clients being not directly part of the public land mobile network (PLMN) such as an external service provider requiring position/location information for operating its service. Therefore, the GMLC 200 provides and supports a gateway interface (Le) 430 or reference point (Le) 430, respectively, which allows for communicating with one or more external LCS clients 330. The GMLC 200 is further connected to the 2G-SGSN 302 via a gateway interface (Lg) 404 and to the 2G-MSC 301 via a gateway interface (Lg) 403 which are employed in accordance with routing information obtainable from the corresponding HLR comprised by the HSS 320. The depicted gateway mobile location center (GMLC) 200 shall represent an arbitrary number of gateway mobile location centers.

The one or more second generation service switching centers (2G-MSC) 301, the one or more second generation serving GPRS (general packet radio service) support nodes (2G-SGSN) 302, the one or more home subscriber service entities (HSS) 320 including second generation home location register (2G-HLR) and the one or more gateway mobile location centers (GMLC) 200 (in case that the GMLC is operated by the provider of the cellular communication network) form the core network and particular herein the GSM core network connected via the aforementioned Abis interface 401 and Gb interface 402 to the GERAN 300.

The external LCS client 330 represents an arbitrary number of external LCS clients allowed for accessing the location services (LCS) provided by the GMLC 200. The external LCS client 330 may be an external service provider requiring location/position information about the mobile communication terminal device 100 for e.g. generating a service related information. As aforementioned the external LCS client 330 employs the gateway interface (Le) 430 for accessing, i.e. for transmitting a location request and for receiving a location response. The gateway interface (Le) 430 is a standardized interface and preferably the GMLC 200 and the gateway interface (Le) 430 support the location inter-operability forum mobile location protocol (LIF-MLP) which is a protocol framework for manufacturer inter-operable exchanging of position/location information with the GMLC 200.

The mobile location protocol (MLP) addresses problems in conjunction with complexity and multiplicity of the positioning methods aforementioned and their individual interfaces by providing common interfaces between applications and networks irrespective of air interfaces and positioning technologies and between application content engines. The mobile location protocol further adopts billing interfaces, managing interfaces for access control and interfaces relating to privacy and security issues.

The aforementioned description has shortly introduced to a GSM based public land mobile network (PLMN) being capable of providing location services (LCS). The following description will introduce in an analogous way to a UMTS based public land mobile network (PLMN) being capable of providing location services (LCS).

Typically with respect to a UMTS public land mobile network (PLMN) a mobile communication terminal device 100 (UE; user equipment) is coupled to the corresponding radio access network, herein a UMTS terrestrial radio access network (UTRAN) 310 via an appropriate air interface, furthermore herein a UTRAN air interface (Uu) 410. It shall be noted that the mobile communication terminal device 100 represents one or more mobile communication terminal devices 100 being coupled to the radio access network (UTRAN) 310. The UTRAN 310 comprises typically several node B entities which may implement local measurement units (LMU type B) and radio network controllers (RNC) connected thereto. The location services (LCS) within the presented mobile communication system (UMTS) are moreover supported by one or more mobile service switching center servers (MSC server) 312 and one or more third generation serving GPRS (general packet radio service) support nodes (3G-SGSN) 311. Both the MSC server 312 and the 3G-SGSN 311 contain functionality responsible for the mobile communication terminal device subscription authorization and managing positioning requests of location services (LCS). The involving of either the MSC server 312 or the 3G-SGSN 311 in the localization operation depends among other things on the localization method utilized for determining the mobile communication terminal device 100 as well as the capabilities and functionality implemented in and provided by the mobile communication terminal device 100, particularly the involving of the either MSC server 312 or the 3G-SGSN 311 depends on the capability of the mobile communication terminal device 100 to operate circuit switched data (CSD) service or general packet radio service (GPRS), respectively. The MSC server 312 is coupled to the UTRAN 310 via UTRAN interface (Iu) 411, and in particular this UTRAN interface (Iu) 411 is a UTRAN circuit-switching interface (Iu-CS) 411. The 3G-SGSN 311 is also coupled to the UTRAN 310 via a UTRAN interface (Iu) 412 and particular this UTRAN interface (Iu) 412 is a UTRAN packet-switching interface (Iu-PS) 412.

Since a GERAN such as GERAN 300 may be operated as a functional subset of the UTRAN 310, additional interfaces provide interconnection of the GERAN 300 to the supporting entities of the UTRAN 310, herein the 3G-SGSN 311 and the MSC server 312. Corresponding UTRAN interfaces 405 and 406 (Iu 405; Iu 406) are shown in FIG. 1 interconnecting the GERAN 300 to the MSC server 312 and interconnecting the GERAN 300 to the 3G-SGSN 311, respectively.

Basically, UTRAN LCS (location service) procedures for determining position information about a mobile communication terminal device are standardized and especially the following procedures are to be employed for determining position information:

cell coverage based positioning method;
observed time difference of arrival (OTDOA) positioning method; and
GPS (global positioning system) based positioning method.

The aforementioned position determining procedures are out of the scope of the present invention and reference may be made to the 3$^{rd}$ Generation Partnership Project (3GPP) standard documentation for retrieving detailed descriptions. The UTRAN LCS (location service) procedures for determining position information are performed in the UTRAN 310 and in particular by the serving mobile location center (SMLC) and more particularly by the stand-alone A-GPS SMLC being coupled to the radio network controller (RNC) via a dedicated Iupc interface. The serving mobile location center (SMLC) supports the LCS functionality of the UTRAN 310.

As aforementioned with respect to the GSM public land mobile network description (PLMN) offering location services (LCS), the home subscriber service entity (HSS) 320 represents and includes both a second generation home location register (2G-HLR) and a third generation home location register (3G-HLR). A home location register (HLR) contains at least location service (LCS) subscriber information and routing information and is accessible from the GMLC 200 via a home location register interface (Lh) 420. The comprised 2G-HLR is logically associated with the GERAN 300 and further GSM network components thereof, whereas the comprised 3G-HLR is logically associated with the UTRAN 310 and further UMTS network components thereof.

The depiction of this comprehensive HSS 320 is made for simplifications intended not for limiting the scope of the invention.

The gateway mobile location center (GMLC) 200 operates and serves in the manner described above with reference to the GSM public land mobile network description (PLMN) offering location services (LCS). The GMLC 200 represents a gateway device for receiving, managing and mediating location requests for mobile communication terminal devices and transmitting corresponding responses containing available location/position information about one or more requested mobile communication terminal devices. The GMLC 200 primarily operates as a gateway device being operable with external LCS clients, i.e. clients being not directly part of the public land mobile network (PLMN) such as an external service provider requiring position/location information for operating its services. Therefore, the GMLC 200 provides and supports a gateway interface (Le) 430 or reference point (Le) 430, respectively, which allows for communicating with one or more external LCS clients 330. The GMLC 200 is further connected to the 3G-SGSN 311 via a gateway interface (Lg) 414 and to the MSC server 312 via a gateway interface (Lg) 413 which are employed in accordance with routing information obtainable from the corresponding HLR comprised by the HSS 320.

The one or more service switching center servers (MSC server) 312, the one or more third generation serving GPRS (general packet radio service) support nodes (2G-SGSN) 311, the one or more home subscriber service entities (HSS) 320 including third generation home location register (3G-HLR) and the one or more gateway mobile location centers (GMLC) 200 (in case that the GMLC is operated by the provider of the cellular communication network) form the core network and in particular the UTMS core network connected via the aforementioned Iu interface 411 and Iu interface 412 to the UTRAN 310.

As aforementioned, the external LCS client 330 representing an arbitrary number of external LCS clients accesses the GMLC 200 via the gateway interface (Le) 430 independently of whether the mobile communication terminal device of interest is subscribed in the GERAN 300 or the UTRAN 310. Required routing information can be retrieved by the GMLC 200 from the HSS 320. Therefore, the location inter-operability forum mobile location protocol (LIF-MLP) is supported by the GMLC 200 and provided to external LCS clients.

Further access methods may be provided to external LCS clients, for example an open service architecture service capability server (OSA SCS) 340 and a GSM system control function (gsmSCF) entity 350 are additionally illustratively depicted in FIG. 1. The OSA SCS 340 may be employed via an open service architecture application program interface (OSA API) 440 which in turn accesses the GMLC 200 via a proprietary interface 443. The gsmSCF entity 350 may be employed via the OSA SCS 340 coupled thereto via a further proprietary interface 441. The gsmSCF entity 350 performs communication with the GMLC 200 via a user location interface (Lc) 442.

The presented depiction in FIG. 1 and the description above with reference to FIG. 1 is centralized with respect to the GMLC 200 inter-action and inter-operation in conjunction with the example GERAN 300 and UTRAN 310 and their further supporting components. It should be understood that the depiction comprising the referred components and interfaces (reference points) is not shown in exhaustive detail herein. For more detailed descriptions references are to be made to the corresponding standard description.

In order to further illuminate the difficulties of the state of the art techniques to be overcome by the present invention a position/location request of an internal client and an external client will be described in the following. In the following, the internal client shall be understood as a mobile communication terminal device being subscribed in the GERAN 300 or the UTRAN 310, whereas the external client shall be understood as an external LCS client being for example a service content provider for example being independent from the GERAN 300 and UTRAN 310 service provider.

I. Mobile terminating location request (MT-LR): A MT-LR is initiated by an external LCS client in order to receive location/position information of a certain mobile communication terminal device denoted as a target mobile communication terminal device. In the following a sequence of operations is presented outlining a procedure being based on the mobile terminating location request (MT-LR).

(a) The external LCS client 330 requests a current position/location of the target mobile communication terminal device 100 from the GMLC 200. The request receiving GMLC 200 may verify the LCS client identity, authorization and entitlement of the requested location services (LCS) as well as derive an addressable identification of the target mobile communication terminal device 100 from the request data or subscription data, i.e. a MSISDN (mobile station integrated services data network) identification, an IMSI (international mobile subscriber identity) identification, a packet data related address identification or the like. The GMLC 200 receives also further LCS related information comprising for example LCS type information (e.g. current position/location), LCS quality of service (QoS) information (e.g. accuracy, response time) and the like.

(b) The GMLC 200 may retrieve routing information from the HSS/HLR 320 about the target mobile communication terminal device 100 by a request-response procedure. The retrieved routing information identifies in case of the target mobile communication terminal device 100 being subscribed in the GERAN 300 either the 2G-MSC 301 or the 2G-SGSN 302 or both for supporting and delivering the position/location information, respectively, in case of the target mobile communication terminal device 100 being subscribed in the UTRAN 300 either the MSC server 312 or the 3G-SGSN 311 or both for supporting and delivering the position/location information, respectively.

The selection of the 2G-MSC 301, 2G-SGSN 302, MSC server 312, 3G-SGSN 311 for serving location/position information to the GMLC 200 may be based on a prioritizing procedure, the capability of the mobile communication terminal device 100 and the LCS capabilities set of the aforementioned servicing entities 301, 302, 312 and 311.

(c) The 2G-MSC 301 and the MSC server 312 support circuit-switched (SC) data communication, respectively, and correspondingly, a circuit-switched MT-LR (CS-MT-LR) is further operated for determining the position/location. For example, the CS-MT-LR is employed in conjunction with a call (CS related call).

The 2G-SGSN 302 and the 3G-SGSN 311 support packet-switched (PS) data communication, respectively, and correspondingly, a packet-switched MT-LR (PS-MT-LR) is further operated for determining the position/location. For example, the PS-MT-LR is employed in conjunction with a packet-switched data communication session.

(c.1) CS-MT-LR (circuit-switched MT-LR):

The GMLC 200 transmits a location/position request message to the 2G-MSC 301 and the MSC server 312, respectively, being indicated by the HSS/HLR 320. The location/position request message contains at least information about the identity of the target mobile communication terminal device 100 and LCS related information. The MSC/MSC server 301/312 is responsible for notifying the target mobile communication terminal device 100 of the requested LCS in case notification is requested or privacy regulations prescribe the notification (privacy verification).

The MSC/MSC server 301/312 sends a location/position request message to the RAN, respectively, herein either the GERAN 300 or the UTRAN 310, to initiate one of the aforementioned methods for determining a position/location of a mobile communication terminal device. The employed method for determining a position/location of a mobile communication terminal device takes consideration of the requested QoS information. Results of the performed position/location determining method is returned to the initial location/position request message sending entity, i.e. the 2G-MSC 301 and the MSC server 312, respectively. The results may either comprise location/position information in case of a successful determination or may comprise error information in case of an unsuccessful determination.

Either the employed 2G-MSC 301 or the employed MSC server 312 returns furthermore the received results of the performed position/location determining method to the GMLC 200 comprising supplementary age information.

(c.2) PS-MT-LR (packet-switched MT-LR):

The GMLC 200 transmits a location/position request message to the 2G-SGSN 302 and the 3G-SGSN 311, respectively, being indicated by the HSS/HLR 320. The location/position request message contains at least information about the identity of the target mobile communication terminal device 100 and LCS related information. The 2G-SGSN/3G-SGSN 302/311 is responsible for notifying the target mobile communication terminal device 100 of the requested LCS in case notification is requested or privacy regulations prescribe the notification (privacy verification).

The 2G-SGSN/3G-SGSN 302/311 sends a location/position request message to the RAN, respectively, herein either the GERAN 300 or the UTRAN 310, to initiate one of the aforementioned methods for determining a position/location of a mobile communication terminal device. The employed method for determining a position/location of a mobile communication terminal device takes account of the requested QoS information. Results of the performed position/location determining method is returned to the initial location/position request message sending entity, i.e. the 2G-SGSN 302 and the 3G-SGSN 311, respectively. The results may either comprise location/position information in case of a successful determination or may comprise error information in case of an unsuccessful determination.

Either the employed 2G-SGSN 302 or the employed 3G-SGSN 311 returns furthermore the received results of the performed position/location determining method to the GMLC 200 comprising supplementary age information.

(d) The GMLC 200 transmits the position/location information received from one of the 2G-MSC 301, the MSC server 312, the 2G-SGSN 302 and the 3G-SGSN 311 as a request response to external LCS client 330. The GMLC 200 is also able to transform the coding of the position/location information (universal location co-ordinates) provided by the SGSNs or the MSC/MSC server into a desired geographic system requested by the external LCS client 330 before transmitting thereto.

II. Mobile originating location request (MO-LR): A MO-LR is initiated by an internal LCS client, i.e. a mobile communication terminal device, in order to receive self-relating location/position information. In the following a sequence of operations is presented outlining a procedure being based on the mobile originating location request (MO-LR).

(a) The mobile communication terminal device 100 establishes or employs an established radio communication/signaling connection to convey a service request (a connection management service request) via the RAN to one of the LCS serving entities, i.e. in case of the RAN associated to the mobile communication terminal device 100 being the GERAN 300, either the 2G-MSC 301 of the 2G-SGSN 302 and in case of the RAN associated to the mobile communication terminal device 100 being the UTRAN 310, either the MSC server 312 or the 3G-SGSN 311.

The 2G-MSC 301 and the MSC server 312 support circuit-switched (SC) data communication, respectively, and correspondingly, a circuit-switched MO-LR (CS-MO-LR) is further operated for determining the position/location. For example, the CS-MO-LR is employed in conjunction with a call (CS related call).

The 2G-SGSN 302 and the 3G-SGSN 311 support packet-switched (PS) data communication, respectively, and correspondingly, a packet-switched MO-LR (PS-MO-LR) is further operated for determining the position/location. For example, the PS-MO-LR is employed in conjunction with a packet-switched data communication session.

(b) CS-MO-LR (circuit-switched MO-LR):

(b.1) The service request is answered from the corresponding location service entity, i.e. either the addressed 2G-MSC 301 or the addressed MSC server 312, by a service response indicating the acceptance of the service request including information about the available and utilizable LCS capabilities and the mobile communication terminal device invokes location services provided by the 2G-MSC/ MSC server 301/312 by transmitting a CS-MO-LR message thereto containing additionally LCS related information and optionally identification information about one or more supplementary LCS receiving clients to receive also position/location information. A GMLC address may be specified in the message or may be provided by the 2G-MSC/MSC server 301/312 for serving position/location information to external supplementary LCS receiving clients, herein for example the address of the GMLC 200. The 2G-MSC/MSC server 301/312 sends a location/position request message to the RAN, respectively, herein either the GERAN 300 or the UTRAN 310, to initiate one of the aforementioned methods for determining a position/ location of the mobile communication terminal device 100. The employed method for determining a position/location of a mobile communication terminal device 100 takes account of the requested QoS information. Results of the performed position/location determining method is returned to the mobile communication terminal device 100 and to the initial location/position request message sending entity, i.e. the 2G-MSC 301 and the MSC server 312, respectively. The results may either comprise location/position information in case of a successful determination or may comprise error information in case of an unsuccessful determination.

(b.2) In case that the mobile communication terminal device 100 has also identified one or more supplementary external LCS clients to receive the position/location information the 2G-MSC/MSC server 301/312 conveys a MAP (mobile application part) subscriber location report to GMLC 200 containing identification information about the mobile communication terminal device 100 about the one or more supplementary clients and further procedure related information. The MAP subscriber location report is answered from the GMLC 200 by a MAP subscriber location report acknowledgement response.

(b.3) The GMLC 200 transfers correspondingly the position/ location information to the identified one or more external LCS clients.

(b.4) The MSC/MSC server 301/312 reports the successful transmission of the MAP subscriber location report to the mobile communication terminal device 100 and release the CM and radio communication connection.

(c) PS-MO-LR (packet-switched MO-LR):

(c.1) The service request is answered from the corresponding location service entity, i.e. either the addressed 2G-SGSN 302 or the addressed 3G-SGSN 311, by a service response indicating the acceptance of the service request including information about the available and utilizable LCS capabilities and the mobile communication terminal device invokes location services provided by the 2G-SGSN/3G-SGSN 302/311 by transmitting a PS-MO-LR message thereto containing additionally LCS related information and optionally identification information about one or more supplementary LCS receiving clients to receive also position/location information. A GMLC address may be specified in the message or may be provided by the 2G-SGSN/3G-SGSN 302/311 for serving position/location information to external supplementary LCS receiving clients, herein for example the address of the GMLC 200. The 2G-SGSN/3G-SGSN 302/311 sends a location/position request message to the RAN, respectively, herein either the GERAN 300 or the UTRAN 310, to initiate one of the aforementioned methods for determining a position/ location of the mobile communication terminal device 100. The employed method for determining a position/location of a mobile communication terminal device 100 takes account of the requested QoS information. Results of the performed position/location determining method is returned to the mobile communication terminal device 100 and to the initial location/position request message sending entity, i.e. the 2G-SGSN 302 and the 3G-SGSN 311, respectively. The results may either comprise location/position information in case of a successful determination or may comprise error information in case of an unsuccessful determination.

(c.2) In case that the mobile communication terminal device 100 has also identified one or more supplementary external LCS clients to receive the position/location information the 2G-SGSN/3G-SGSN 302/311 conveys a MAP (mobile application part) subscriber location report to GMLC 200 containing identification information about the mobile communication terminal device 100 about the one or more supplementary clients and further procedure related information. The MAP subscriber location report is answered from the GMLC 200 by a MAP subscriber location report acknowledgement response.

(c.3) The GMLC 200 transfers correspondingly the position/ location information to the identified one or more external LCS clients.

(c.4) The 2G-SGSN/3G-SGSN 302/311 reports the successful transmission of the MAP subscriber location report to the mobile communication terminal device 100.

As described above in (I) and (II) with reference to the MT-LR and MO-LR procedure, it can be seen that both procedures handle the problem of requesting a determination of position/location information about a mobile communication terminal device. But the description also illustrates that the current invention distinguishes in the handling of the procedures between location applications corresponding to their physical residences i.e. internal requests for position/location information are handled differently compared with external requests for position/location information. The mobile communication terminal device originated location request (MO-LR) is based on RAN access handled by either a 2G-SGSN/ 3G-SGSN or a 2G-MSC/MSC server and is based on the mobile application part (MAP). The MO-LR may be further supported by an additional serving mobile location center (SMLC). Correspondingly, the functions implemented in the mobile communication terminal device 100 for offering location services to applications operated thereon, requiring and utilizing the position/location information have to be adopted to the radio access network (RAN) to which the mobile communication terminal device 100 is associated. The description shown in FIG. 1 relates as an example to GERAN and UTRAN. Further cellular standards of RANs are used having location service functions equivalent to the presented MO-LR or may even lack of location services (LCS) such as the IS-95 standard.

FIG. 2*a* illustrates an operational sequence carried out by a mobile communication terminal device according to an embodiment of the invention. The operational sequence illustrates example operations to overcome the above described problems concerning the MO-LR procedure. The depicted operational sequence provides a procedure to be employed independently from their origination, i.e. the same procedure can be applied by a location application being resident in the mobile communication terminal device and being resident in an external entity acting as an external LCS client. The illustrated operational sequence is denoted as a terminal originated location query (TO-LQ). The TO-LQ is operated as an internet-based protocol, i.e. a radio access network (RAN) independent protocol.

In an operation S100, an embodiment of the TO-LQ procedure according to the invention begins.

In an operation S110, the TO-LQ is initiated by an initiator. The initiator may be an input of a user of the mobile communication terminal device, an application executed by the mobile communication terminal device receiving a user input or operating autonomously or an intermediate device such as an internal location server function being associated to or implemented in the mobile communication terminal device.

In an operation S120, a location request in accordance with the TO-LQ is encoded containing commands and location request related information. The location request is encoded in such a way that a location request receiving entity which is to serve a corresponding response containing position/location information in accordance with the TO-LQ location request is able to decode the location request and parse the decoded commands and location request related information to operate accordingly. Therefore, a location request may contain one or several of the following types of information: mobile communication terminal device identification information, authorization information, verification information, LCS type information allowing to define different types of location services such as location determination method, location of the mobile communication terminal device, location of the mobile communication terminal device to be sent to another LCS accepting entity, location assistance data, ciphering keys and quality of service information such as accuracy of position/location information, response period of time.

Supplementary information relating to the aforementioned information may be further contained, for example a GMLC identification/address information defining the GMLC for conveying position/location information to the other LCS accepting entity, identification/address information about the LCS accepting entity and the like.

The encoding is for example operated by a dedicated software module or code section responsible for encoding the location request. The encoding of a valid location request can be based on a well-defined extensible markup language (XML) document in conjunction with a corresponding document type definition (DTD), wherein the well-defined XML document contains the aforementioned LCS related information and commands for instructing the requested location services. A GMLC may be able to receive, decode and parse such a XML document containing a LCS request in accordance with the presented TO-LQ. The dedicated software module or code section may be realized as a stand-alone application to be called via a proper defined application program interface (API). Further, the dedicated software module or code section may be a plug-in software module or an equivalent code section such as known from browser applications having software interfaces for associating plug-in software modules.

In an operation S130, the encoded location request is transmitted to the position/location serving entity. The transmitting of the location request may involve a binding of the location request to an appropriate bearer and service allowing for transmitting the encoded location request. An IP (internet protocol) based HTTP (hypertext transfer protocol) and WSP/WAP (wireless session protocol/wireless application protocol) based messages are suitable for transporting the encoded location request in a radio access network (RAN) independent manner. For example, the encoded location request is bound to a HTTP message and additional information such as receiving entity address (e.g. IP address of the GMLC), MIME (multimedia internet mail extension) type etc. are additionally encoded for the transmission. Analogously, the encoded location request is bound to a WAP/WSP message and additional information such as receiving entity address, MIME type etc. are additionally encoded for the transmission. The resulting HTTP or WSP message(s) may be transmitted via a circuit-switched (CS) data communication connection (e.g. HSCSD service: high speed circuit switched data service) or a packet-switched (PS) data communication connection (e.g. GPRS: general packet radio system). The employed communication service and communication bearer depends on the capabilities of the associated RAN and the receiving LCS serving entity (e.g. the GMLC).

In case of a HTTP/WSP bound location request message a HTTP stack or WSP stack within the mobile communication terminal device is called, respectively, for transmitting the TO-LQ location request to the HTTP-base position/location serving entity, e.g. the GMLC. In case that the mobile communication terminal device employs the WAP stack (WSP) for transmitting the encoded TO-LQ location request, a dedicated proxy device or gateway device negotiates between WSP and HTTP and transforms WSP based communication into HTTP based communication and vice versa, respectively, wherein the latter communication is supported by the location request receiving entity, .e.g. the GMLC.

The operation S130 of transmitting the location request may be succeeded with operation S140 or operation S170, respectively, depending on whether the mobile communication terminal device expects a location response in sequence to the location request or not.

In an operation S170, the operational sequence is finished, i.e. a succeeding location response is not awaited.

In the operation S140, the mobile communication terminal device awaits a location response as a consequence of the transmitted location request. The location response may be awaited within a certain period of time. The location response contains information about position/location in accordance with the provided commands and location request related information encoded in the previously transmitted location request. The location response may also contain error information in case that the requested location services have failed and moreover the error information may cover information about the error reason. In correspondence with the transmission, the location response is received as HTTP based or WSP based communication for example via one of the aforementioned bearers supported by the employed radio access network (RAN) and mobile communication terminal device.

In an operation S150, the received location response is decoded and parsed in order to prepare the contained response information for being provided or passed on to further position/location processing applications of the mobile terminal device, particularly for being passed on to the initiator of the location request having initiated the depicted operational sequence.

The location response may be a well-defined XML document encoded by the position/location serving entity, e.g. the GMLC, in conjunction with a corresponding document type description (DTD). Such a XML-based location response requires a decoding and parsing by a dedicated software module or code section capable for encoding XML documents being based on the corresponding document type description (DTD). The dedicated software module or code section may be implemented additionally to support the aforementioned plug-in software module or plug-in code section or an equivalent software solution.

In an operation S160, the decoded and parsed information contained in location response is provided or passed on to the plug-in software module or to one or more applications further processing the information.

The presented operational sequence with reference to FIG. 2a offers an alternative mobile communication terminal device originating location response solution, i.e. an alternative location request in comparison to the aforementioned presented and discussed MO-LR.

Well-defined XML documents allowing for encoding a location request and a location response as a consequence of such a location request may be based on a binary encoding of these XML documents, particularly on wireless binary extensible markup language (WBXML). A binary encoding contributes to an efficient data communication, i.e. saves bandwidth in wireless communication systems, which is economical to the user since he saves money and for the provider of the cellular communication cellular network. Such a WBXML encoding is specified by the WAP Forum to be used in conjunction with location services. The WAP Forum LCS related protocol is optimized for external LCS clients offering a huge number of functions which causes a complex structure resulting in a heavyweight protocol such that an implementation of the WAP Forum LCS related protocol in mobile communication terminal device seems currently not to be sensible.

The MLP protocol employed for location related data communication between external LCS clients and the GMLC provides also a well-defined XML encoding of related location documents. But the LIF MLP protocol is optimized for external LCS clients offering a huge number of functions which causes a complex structure resulting in a heavyweight protocol such that an implementation of the MLP protocol in mobile communication terminal device seems currently not to be sensible.

Both the LIF MLP protocol as well as the WAP Forum LCS related protocol may be used to derive a lightweight subset from either thereof (while respecting the design and encoding technology) resulting in an applicable protocol variant capable of implementation in a mobile communication terminal device. Interoperability aspects have to be considered in the derived protocol variants by adapting functions thereof.

The operational sequence depicted in FIG. 2a relates to an embodiment of the inventive method carried out by a mobile communication terminal device, i.e. relates to encoding a location request and decoding a location response as a consequence of a location request. The following operational sequence presents an embodiment of the corresponding inventive method concerning the decoding of the location request and encoding of the corresponding location response.

Figure 2B:
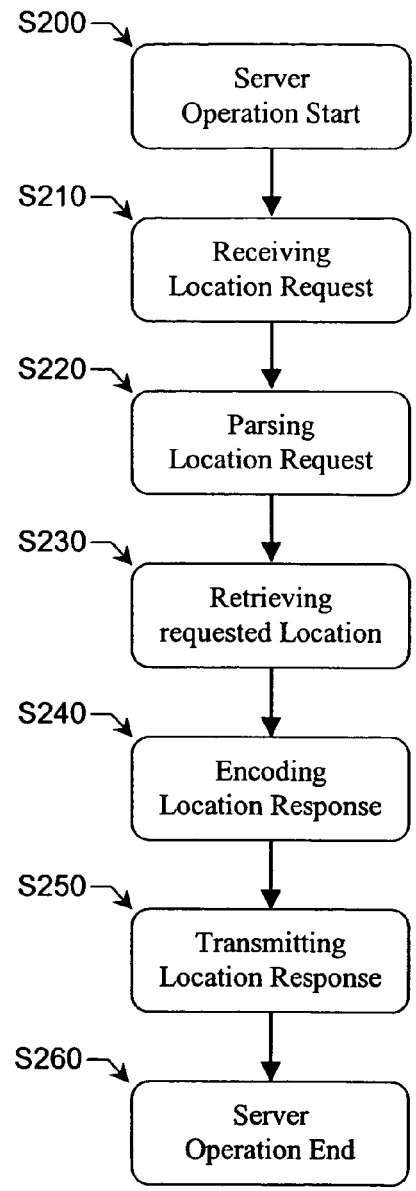
FIG. 2b shows a second flow chart illustrating an operational sequence carried out by a location serving networked device according to an embodiment of the invention.

FIG. 2b illustrates an operational sequence carried out by a location serving networked device according to an embodiment of the invention.

In an operation S200, an embodiment of the TO-LQ procedure according to the invention performed at the location serving entity, i.e. herein the GMLC, begins.

In an operation S210, the GMLC receives the location request which has been coded in operation S120 and transmitted in operation S130 shown in FIG. 2a. The location request is received via a communication interface allowing data communication via the RAN with the mobile communication terminal device. The communication interface may handle IP based data communication and particularly HTTP based data communication over an IP based connection.

The location request may be received as a HTTP bound location request message handled via a HTTP stack provided by the GMLC. The location request is extracted from the HTTP bound location request message.

In an operation S220, the GMLC decodes and parses the location request containing location request related information and commands as described above with respect to FIG. 2a. In case that the location request is a well-defined XML document, the GMLC implements a corresponding decoder and parser for decoding and parsing the well-defined XML document under consideration of the corresponding document type description (DTD).

The resulting location request related information and commands instruct and allow the GMLC to operate the location services.

In an operation S230, the requested position/location information is retrieved by the GMLC. The retrieving of the requested position/location information may require supplementary operations and location procedures. Particularly, the GMLC retrieves the position/location information in accordance with the GMLC controlled operations illustrated with respect to the MT-LR procedure described with reference to FIG. 1 as operations (b) to (c). That is, routing information of a following LCS request to the RAN may identify a 2G-SGSN/3G-SGSN or a 2G-MSC/MSC server associated to the RAN to which the mobile communication terminal device is subscribed. The routing information may be present in the GMLC or, if necessary, the routing information may be requested from the HSS/HLR of the cellular communication network. Further priority information returned from the HSS/HLR or available to the GMLC is taken into account for the routing decision. The location requesting procedure equivalent to a CS-MT-LR or a PS-MT-LR is carried out via the identified 2G-MSC/MSC server or the identified 2G-SGSN/3G-SGSN, respectively. Either the 2G-MSC/MSC server or the 2G-SGSN/3G-SGSN obtains the requested position/location information from the GERAN or UTRAN, respectively, and returns the obtained position/location information to the GMLC. The GERAN and UTRAN determines the position/location of the mobile communication terminal device in accordance with the available and/or supported individual positioning procedures which may or may not involve an interacting (data communication) with the target mobile communication terminal device.

The individual positioning procedures comprise comprehensively:
   cell coverage based positioning method;
   observed time difference of arrival (OTDOA) positioning method (in UTRAN) and enhanced observed time difference (E-OTD) positioning method (in GERAN), respectively; and
   GPS (global positioning system) based positioning method;
wherein the cell coverage based positioning method requires no explicit support by the target mobile communication terminal device. Different methods may also be combined for better accuracy.

The data communication of the GMLC for retrieving position/location information in accordance with the location request of the mobile communication terminal device is performed as a mobile application part (MAP) service employing the respective MAP interfaces.

In an operation S240, the position/location information retrieved by the GMLC is encoded for being transmitted. The encoding of a valid location response can analogously be based on a well-defined extensible markup language (XML) document in conjunction with a corresponding document type definition (DTD), wherein the well-defined XML document contains the aforementioned retrieved position/location information and further related information such as accuracy of the retrieved position/location. The mobile communication terminal device may be able to receive, decode and parse such a XML document containing the position/location information retrieved in consequence on the previously transmitted location request. A dedicated software module or code section may be realized as a stand-alone application to be called via a proper defined application program interface (API) for carrying out the encoding.

An IP (internet protocol) based HTTP (hypertext transfer protocol) is analogously suitable for transporting the encoded location response to the mobile communication terminal device routed via the radio access network (RAN) being associated thereto. For example, the encoded location response is bound to a HTTP message and additional information such as receiving entity address (e.g. IMSI: international mobile subscriber identification, MSISDN identification: mobile station integrated services data network identification or a packet service identification), MIME (multimedia internet mail extension) type etc. are additionally encoded for the transmission.

In an operation S250, if the received location request instructs to retransmit, the encoded location response is transmitted back to the mobile communication terminal device. Further, if the received location request instructs to retransmit, the encoded location response may be transmitted to another receiving entity defined in the location request, for example exclusively or additionally thereto. If further instructed, a notification may be transmitted back to the mobile communication terminal device indicating that the location response has been transmitted to the further defined receiving entity, for example an external LCS client.

In an operation S260, the operational sequence is finished.

Figure 3:
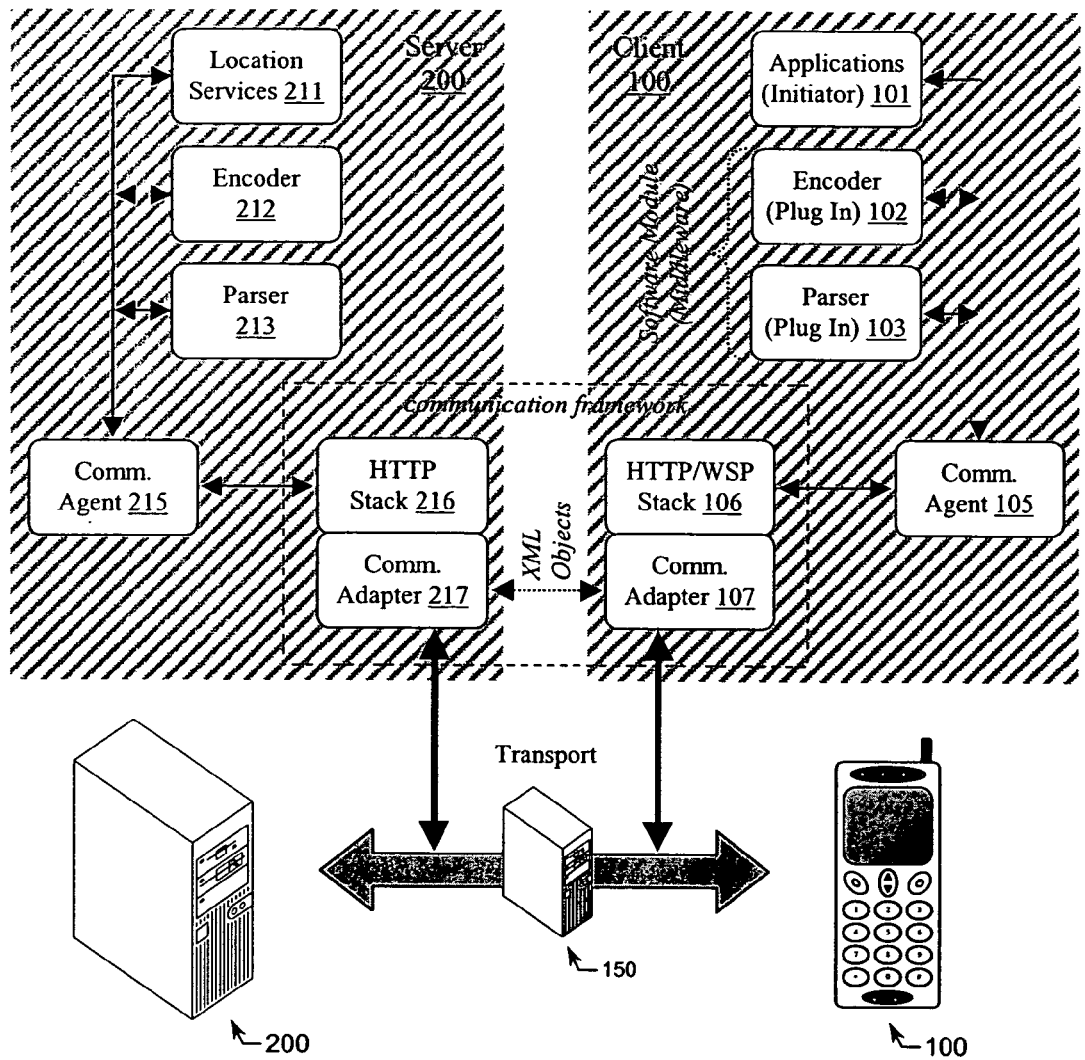
FIG. 3 shows a block diagram illustrating components of both a mobile communication terminal device and a location serving networked device allowing for carrying out the aforementioned operational sequences according to an embodiment of the invention.

FIG. 3 illustrates components of both a mobile communication terminal device and a location serving networked device allowing for carrying out the aforementioned operational sequences according to an embodiment of the invention. A system of a mobile communication terminal device 100 and a location serving entity 200 such as a GMLC 200 is provided. Both the mobile communication terminal device 100 and the GMLC 200 are able to operate the aforementioned operational sequences according to embodiments of the invention. The mobile communication terminal device 100 operates a HTTP stack 116 allowing for data communication with the GMLC 200 also operating a HTTP stack 216. The mobile communication terminal device 100 operates alternatively a WAP stack (WSP) allowing for data communication with the GMLC 200 via a HTTP/WSP proxy device 150 or gateway device 150, respectively. The proxy device 150 or gateway device 150 is responsible for translating WSP based communication to HTTP based communication or vice versa, respectively. In general, the data communication between the mobile communication terminal device 100 and the GMLC 200 is conveyed via the radio access network (RAN) to which the mobile communication terminal device 100 is associated and which offers inter-operable data communication capability to the GMLC 200 for example being connected an IP based network such as the internet.

The mobile communication terminal device 100 implements according to an embodiment of the invention applications 101, an encoder 102, a parser 103, a communication agent 105, the HTTP and/or WAP stack (WSP stack) 106 and a communication adapter or communication air interface 107. The parser 103 is operated as a decoder, parser and/or interpreter for decoding parsing and/or interpreting location responses received by the mobile communication terminal device 100. The parser 103 is responsible to process the received location response in such a way that the position/location information contained therein are in a coding suitable to be provided or passed on to one or more applications using or processing the position/location information. Correspondingly, the functionality of the parser 103 depends on the encoding technique employed for encoding the location response.

The GMLC 200 implements according to an embodiment of the invention location services 211, an encoder 121, a parser 213, a communication agent 215, the HTTP stack 216 and a communication adapter or network interface 217. The parser 213 is operated as a decoder, parser and/or interpreter for decoding parsing and/or interpreting location request received from the mobile communication terminal device 100. The parser 213 is responsible to process the received location request in such a way that the location request related information and commands contained therein are in a coding suitable to be provided or passed on to one or more applications processing the retrieving of the requested position/location information in accordance to the location request. Correspondingly, the functionality of the parser 103 depends on the encoding technique employed for encoding the location request.

In accordance with the aforementioned methods according to embodiments of the invention, the operational sequences will be repeated in a short way to enlighten the inter-acting and the functionality of the depicted components. One of the applications 101 operable on the mobile communication terminal device 100 initiates a request asking for location services, e.g. asking for the current position of the mobile communication terminal device 100. A dedicated location service software tool may encode a corresponding location request containing instructions and location request related information defining the demanded location service. The dedicated location service software tool may be an application of the applications 101 performing the encoding in conjunction with the encoder 102 (being e.g. a plug-in software tool) or dedicated location service software tool may be the encoder 102. As aforementioned, the encoded location request may be a well-defined XML-based location request and particularly a well-defined WBXML-based location request. This encoded location request is to be transmitted to a dedicated location service serving entity, herein the GMLC 200. The communication agent 105 provides for a binding of the encoded location request to an appropriate and supported communication protocol and an appropriate and supported communication bearer. An appropriate communication protocol being supported in almost all cellular communication networks is wireless application protocol (WAP) and the wireless session protocol (WSP), respectively. Moreover, a huge number of operated cellular communication networks also allow for employing hypertext transfer protocol (HTTP). The wireless application protocol (WAP) and the wireless session protocol (WSP) as well as hypertext transfer protocol (HTTP) are suitable to bind the encoded location request thereto. The bound encoded location request is further passed on to a corresponding protocol stack 106 (i.e. the HTTP and/or WSP stack 106) to be transmitted via the communication adapter 107 to the radio access network (RAN) such as the aforementioned GERAN or the aforementioned UTRAN. In the mobile communication terminal device 100, the communication adapter 107 is an over-the-air communication adapter providing for the employment of an appropriate bearer supported by the associated RAN.

The inventive terminal originating location query (TO-LQ) is intended to be operable independently from the associated radio access network which is guaranteed by employing HTTP, WAP or WSP, respectively, allowing for employing IP based location services by the mobile communication terminal device 100. Assuming that the location serving entity, the GMLC 200, is an IP based server, the GMLC 200 supports HTTP and expects to receive the location request from the mobile communication terminal device 100 bound to a HTTP based message. In case that the location request is bound to a WAP or WSP based message, respectively, a mediating network entity 150 such as a WAP/WSP proxy or WAP/WSP gateway, provides for transforming the WAP/WSP based location message into a corresponding HTTP based message and vice versa, respectively.

The finally HTTP based location request is received by the communication adapter 217 of the GMLC 200 and passed on to a HTTP stack and a communication agent 215 extracting the encoded location request thereof. The encoded location request is decoded, parsed and interpreted by the parser 213 in order to operate the location services 211 of the GMLC 200 in accordance with the location request. The parser 213 has to process the encoded location request in an analogous but inverse way in comparison to the operation of the encoder 102 implemented in the mobile communication terminal device 100. That is, in case of a location request encoded on the basis of a well-defined XML document or a well-defined WBXML document, respectively, the parser 213 parses and interprets the XML/WBXML encoded location request on the basis of the corresponding document type description (DTD). The resulting commands and location request related information are passed on to the location services 211 provided by the GMLC 200. The location services 211 of the GMLC 200 is to be understood as the gateway service allowing for accessing the requested position/location information from the core network of the cellular system to which the mobile communication terminal device 100 is subscribed or for accessing the position/location determining procedures supported and provided by the radio access network thereof.

In case that a location response is requested and expected by the mobile communication terminal device 100, the retrieved position/location information is encoded by the encoder 212 supplied with the retrieved position/location information from the location services 211. The encoding of the location response may be based on the same encoding technique being employed for encoding the location request. The communication agent 215 in turn binds the location response to a HTTP based communication message which is passed on to the HTTP stack 216 and transmitted to the mobile communication terminal device 100 via the communication adapter 217.

If necessary, the mediating network entity 150 converts the HTTP based message into a WAP/WSP based message being supported by the mobile communication terminal device 100.

The mobile communication terminal device 100 receives via the communication adapter 107 the location response which is passed on to the HTTP/WSP stack 106, to the communication agent 105 and finally to the parser 103. The parser 103 has to process the encoded location response in an analogous but inverse way in comparison to the operation of the encoder 212 implemented in the GMLC 200. That is, in case of a location response encoded on the basis of a well-defined XML document or a well-defined WBXML document, respectively, the parser 103, parses and interprets the XML/WBXML encoded location response on the basis of the corresponding document type description (DTD). The resulting location/position information is passed on to one of the applications 101, particularly the location/position information may be passed on the application which has initiated the location request.

The present invention has been described in view of utilizing hypertext transfer protocol (HTTP), wireless application protocol (WAP) and wireless session protocol (WSP). Further the present invention has been described in view of utilizing the corresponding communication protocol stacks such as hypertext transfer protocol stack, wireless application protocol stack and wireless session protocol stack. These communication protocols and communication protocol stacks shall be understood as representing example implementations of the embodiments according to the invention. A broad number of further communication protocols (e.g. the wireless datagram protocol) and corresponding communication protocol stacks (e.g. the wireless datagram protocol stack) are available for being used in conjunction with the embodiments according to the invention, respectively, and the implementation of them instead of the described one is well known by those known in the art. Corresponding to the aforementioned mediating network entity 150 representing a WAP/WSP proxy or WAP/WSP gateway, providing for transforming WAP/WSP based location messages into a corresponding HTTP based messages and vice versa, respectively, the mediating network entity 150 is adapted to provide for transforming the communication protocol(s) employed by the communication terminal device 100 into the communication protocol(s) employed by the location serving entity 200 and vice versa, respectively.

It shall be further noted that binary coding of extended markup language (XML) has been primarily referred to as wireless binary extended markup language (WBXML). The wireless binary extended markup language (WBXML) represents the most common binary coding for extended markup language (XML) used in conjunction with wireless communications. Since the kind of encoding of the targeted requests and responses according to embodiments of the invention is not effecting the conceptional idea on which the present invention is based, the coding may be performed in any suitable way (being understood by both the transmitting entity and the receiving entity) and especially, the binary coding of extended markup language (XML) may be based on any definition different to the wireless binary extended markup language (WBXML) being a specific representative of the group of binary coded extended markup language.

It will be evident to those skilled in the art that as the technology advances, the inventive concept can be implemented in a several different number of ways. The invention and its embodiments are thus not limited to the examples described above but may vary within the scope of the claims.

The invention claimed is:

1. A method, comprising
receiving an initiation indicating to encode a location request requesting location information of a mobile communication terminal device;
encoding the location request in a predefined coding format, said location request containing at least identification information of said mobile communication terminal device and at least a command instructing a location serving networked device to retrieve location information of said mobile communication terminal device;
bounding said encoded location request to an internet-based communication protocol independent of a radio access network to which said mobile communication terminal device is subscribed;
adding information related to said communication protocol to said location request; and
determining to transmit said bounded location request via a communication stack corresponding to said communication protocol via a wireless communication network.

2. A method, according to claim 1, further comprising
receiving an encoded location response being encoded in accordance with said predefined coding format of said location request, said location response containing at least location information of said mobile communication terminal device; and decoding said encoded location response such that said contained location information is available for further processing.

3. A method, according to claim 1, wherein said predefined coding format comprises one of
a well-defined XML-based format on the basis of a corresponding document type description; and
a well-defined binary coded XML-based format on the basis of a corresponding document type description.

4. A method, according to claim 2, wherein said decoding of said encoded location response comprises:
parsing of said location response.

5. A method of claim 1, wherein said predefined coding format is formatted based on a corresponding document type description.

6. A method, comprising
receiving a location request requesting to serve location information of a mobile communication terminal device, said location request being encoded in a predefined coding format and bound to an internet-based protocol independent of a radio access network to which said mobile communication terminal device is subscribed, said location request containing at least identification information of said mobile communication terminal device and at least a command instructing a location serving networked device to retrieve location information of said mobile communication terminal device;
receiving said location information in accordance with said location request;
encoding a location response in said predefined coding format, said location response containing at least said retrieved location information;
bounding said encoded location response to an internet-based communication protocol independent of a radio access network in which said mobile communication terminal device is subscribed;
adding information related to said communication protocol to said location response; and
determining to transmit said bounded location response, via a communication protocol stack corresponding to said communication protocol, to said mobile communication terminal device.

7. A method, according to claim 6, wherein said predefined coding format comprises one of
a well-defined XML-based format on the basis of a corresponding document type description; and
a well-defined binary coded XML-based format on the basis of a corresponding document type description.

8. A method, according to claim 7, further comprising decoding said encoded location request.

9. A method, according to claim 8, wherein said decoding comprises parsing said encoded location request.

10. A non-transitory computer readable storage medium carrying one or more sequences of one or more instructions which, when executed by one or more processors, cause an apparatus to at least perform the following steps:
receiving an initiation indicating to encode a location request requesting location information of a mobile communication terminal device;
encoding the location request in a predefined coding format, said location request containing at least identification information of said mobile communication terminal device and at least a command instructing a location serving networked device to retrieve location information of said mobile communication terminal device;
bounding said encoded location request to an internet-based communication protocol independent of a radio access network to which said mobile communication terminal device is subscribed;
adding information related to said communication protocol to said location request; and
determining to transmit said bounded location request via a communication stack corresponding to said communication protocol via a wireless communication network.

11. A non-transitory computer readable storage medium according to claim 10, wherein said predefined coding format comprises one of
a well-defined XML-based format on the basis of a corresponding document type description; and
a well-defined binary coded XML-based format on the basis of a corresponding document type description.

12. An apparatus comprising:
at least one processor; and
at least one memory including computer program code,
the at least one memory and the computer program code configured to, with the at least one processor, cause the apparatus to perform at least the following,
receive an initiation indicating to encode a location request requesting location information of a mobile communication terminal device;
encode the location request in a predefined coding format, said location request containing at least identification information of said mobile communication terminal device and at least a command instructing a location serving networked device to retrieve location information of said mobile communication terminal device;
bound said encoded location request to an internet-based communication protocol independent of a radio access network to which said mobile communication terminal device is subscribed;
add information related to said communication protocol to said location request; and
determine to transmit said bounded location request via a communication stack corresponding to said communication protocol via a wireless communication network.

13. An apparatus according to claim 12, wherein the apparatus is further caused to receive a location response being encoded in accordance with said predefined coding format of said location request from said location serving networked device via said cellular communication system, said encoded location response contains at least location information of said mobile communication terminal device; and the apparatus is further caused to decode said encoded location response for making said contained location information available for further processing.

14. An apparatus according to claim 12, wherein said predefined coding format comprises one of
a well-defined XML-based format on the basis of a corresponding document type description; and
a well-defined binary coded XML-based format on the basis of a corresponding document type description.

15. An apparatus according to claim 13, wherein said decoding of said encoded location response comprises:
parsing of said location response.

16. An apparatus comprising:
at least one processor; and
at least one memory including computer program code, the at least one memory and the computer program code configured to, with the at least one processor, cause the apparatus to perform at least the following, receive a location request requesting to serve location information of a mobile communication terminal device, said location request being encoded in a predefined coding format and bound to an internet-based protocol independent of a radio access network to which said mobile communication terminal device is subscribed, said location request containing at least identification information of said mobile communication terminal device and at least a command instructing a location serving networked device to retrieve location information of said mobile communication terminal device;

receive said location information in accordance with said location request;

encode a location response in said predefined coding format, said location response containing at least said retrieved location information;

bound said encoded location response to an internet-based communication protocol independent of a radio access network in which said mobile communication terminal device is subscribed;

add information related to said communication protocol to said location response; and determine to transmit said bounded location response, via a communication protocol stack corresponding to said communication protocol, to said mobile communication terminal device.

17. An apparatus according to claim 16, wherein the apparatus is further caused to decode said encoded location request.

18. An apparatus according to claim 16, wherein said predefined coding format comprises one of a well-defined XML-based format on the basis of a corresponding document type description; and a well-defined binary coded XML-based format on the basis of a corresponding document type description.

19. An apparatus according to claim 17, wherein the apparatus is further caused to parse said encoded location request.

20. A non-transitory computer readable storage medium according to claim 10, wherein the apparatus is caused to further perform:

receiving a location response being encoded in accordance with said predefined coding format of said location request from said location serving networked device via said cellular communication system, said encoded location response containing at least location information of said mobile communication terminal device; and decoding said encoded location response for making said contained location information available for further processing.

21. A non-transitory computer readable storage medium according to claim 20, wherein said decoding of said encoded location response comprises:

parsing of said location response.

22. A non-transitory computer readable storage medium carrying one or more sequences of one or more instructions which, when executed by one or more processors, cause an apparatus to at least perform the following steps:

receiving a location request requesting to serve location information of a mobile communication terminal device, said location request being encoded in a predefined coding format and bound to an internet-based protocol independent of a radio access network to which said mobile communication terminal device is subscribed, said location request containing at least identification information of said mobile communication terminal device and at least a command instructing a location serving networked device to retrieve location information of said mobile communication terminal device;

receiving said location information in accordance with said location request;

encoding a location response in said predefined coding format, said location response containing at least said retrieved location information;

bounding said encoded location response to an internet-based communication protocol independent of a radio access network in which said mobile communication terminal device is subscribed;

adding information related to said communication protocol to said location response; and determining to transmit said bounded location response, via a communication protocol stack corresponding to said communication protocol, to said mobile communication terminal device.

23. A non-transitory computer readable storage medium according to claim 22, wherein the apparatus is caused to further perform: decoding said encoded location request.

24. A non-transitory computer readable storage medium according to claim 23, wherein said decoding comprises parsing said encoded location request.

* * * * *